United States Patent [19]

Buck

[11] Patent Number: 4,477,695

[45] Date of Patent: Oct. 16, 1984

[54] MICROPROCESSOR OPERATED TELECOMMUNICATIONS INTERFACE FOR A TERMINAL OF AN AUTOMATIC TELETYPEWRITER SWITCHING SERVICE

[75] Inventor: Robert J. Buck, Fairfield, Conn.

[73] Assignee: Electronic Mail Corporation of America, New York, N.Y.

[21] Appl. No.: 429,476

[22] Filed: Sep. 30, 1982

[51] Int. Cl.³ ................... H04L 15/00; H04L 3/00
[52] U.S. Cl. ........................... 178/3; 178/2 B; 370/41
[58] Field of Search .............. 178/3, 2 B, 4.1 B, 26 A; 370/41

[56] References Cited

U.S. PATENT DOCUMENTS 3,936,600  2/1976  Galbraith ............................ 178/3
4,354,261  10/1982  Hagen et al. ....................... 178/3

Primary Examiner—Stafford D. Schreyer
Attorney, Agent, or Firm—St. Onge, Steward, Johnston & Reens

[57] ABSTRACT

A microprocessor operated telecommunications interface for connection to a telecommunications line to provide transmission of data between a dedicated terminal of an automatic teletypewriter switching service of the type operating in one code and a data base of the type operating in another code is disclosed. The interface includes a microprocessing unit, a memory for operating the microprocessing unit, a random access memory, a telecommunications modem, means for formating and controlling serial a synchronous data communication and at least two user-actuatable switches for selecting a function of the interface. One function selecting switch accesses the microprocessor unit to the user terminal to provide for entry and editing of message information while a second function selecting means actuates the telecommunications to dial the data base using dialing information stored in the random access memory. The interface is an addition to a conventional terminal of a teletypewriter switching service which permits the terminal to be used for purposes other than those for which it is intended.

24 Claims, 12 Drawing Figures

INTERFACE ORIGINATE MODE

Fig. 5A.

(1) PUSH EITHER
(A) MAIN SWITCH OR
(B) ALTERNATE SWITCH (2) MPU CLOSES MODEM RELAY (3) TIME DELAY TO OBTAIN DIAL TONE (4) DIALING BY MODEM CONTROLLED BY MPU THAT OBTAINS NUMBER FROM RANDOM ACCESS MEMORY (5) TIME DELAY TO OBTAIN RING (6) MODEM LISTENS FOR CONNECT TONE (7) TONE CONNECT, TONE RESPONSE, IDENTIFICATION INFORMATION SENT (A) INTERMEDIATE CARRIER OR (b) DATA BASE

IF NO TONE CONNECT WITHIN PREDETERMINED TIME, MPU OPENS MODEM RELAY

MPU GIVES PROMPT TO USER TO USE ALTERNATE DIAL VIA STEPS 1(B), 2, 3, 4, 5, 6 AND 7(B)

FIG. 5B

Fig. 5B. Interface Originate Mode

DATA BASE ORIGINATE AND INTERFACE ANSWER MODE

INTERFACE OFF-LINE EDIT

CLEAR INTERFACE

IDLE MODE

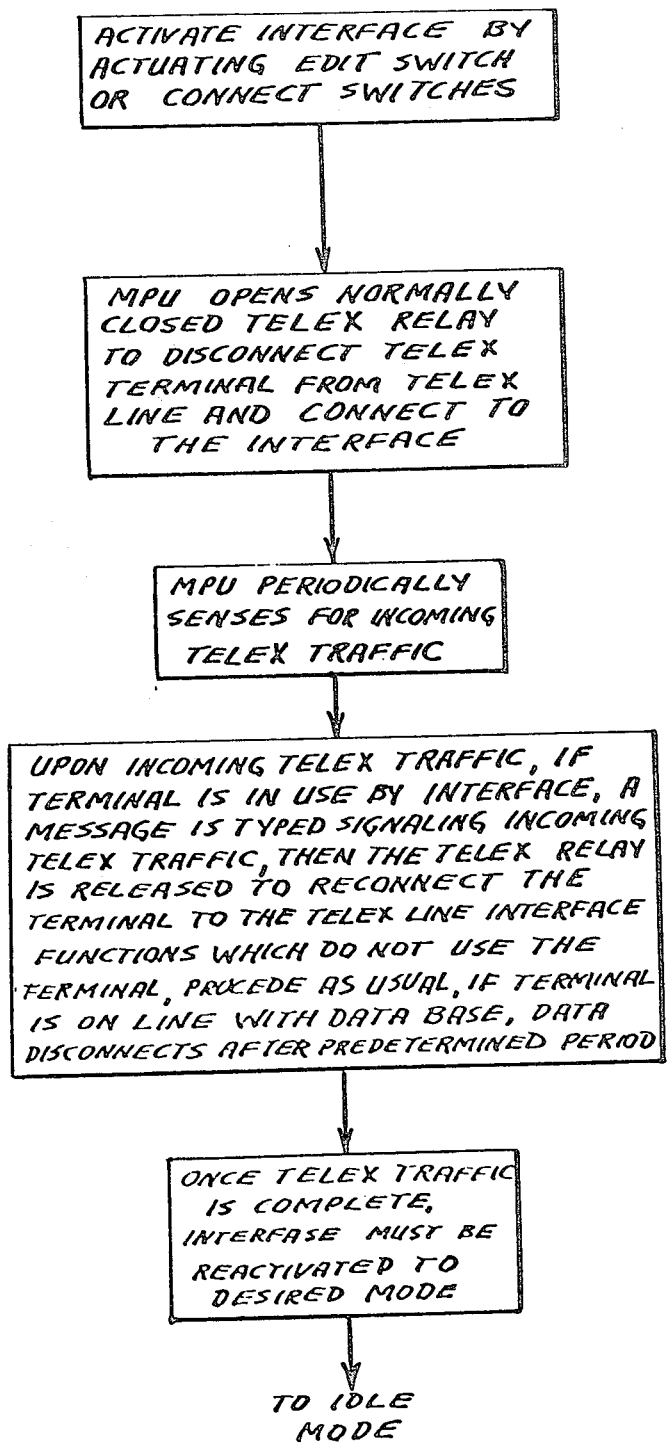
Fig. 11. TELEX TRAFFIC INTERRUPT FOR TERMINAL INTERFACE

MICROPROCESSOR OPERATED TELECOMMUNICATIONS INTERFACE FOR A TERMINAL OF AN AUTOMATIC TELETYPEWRITER SWITCHING SERVICE

BACKGROUND OF THE INVENTION (1) Field of the Invention

The present invention relates to interfacing of a user terminal of an automatic teletypewriter switching service to a database such as, for example, a computer for transmitting electronic mail, a user accessible library, a computer used for mathematical computations, or other types of databases. More particularly, the present invention relates to a microprocessor operated telecommunications interface for connection to a telecommunications line to provide for transmission of data between a user terminal and a database over a telephone line either using telephone company lines or intermediate carriers. The present invention also relates to a method of interfacing a user terminal with a remote database.

(2) Description of the Prior Art

Many database services exist that are accessable by remote cathode ray tube terminals. The databases may be of various types, such as, for example, electronic mail services, library services, computing services and any other computer assisted services. When a user accesses a database, the user connects his terminal with a database by using a telecommunications modem and enters information into the CRT terminal which identifies the user, the type of terminal and other information required to put the terminal on-line with the database. The user may dial the database either by direct telephone service or by local telephone service and an intermediate carrier, and enter information for hand-shaking with the database including a user code, a baud rate of the user terminal, and various other information used to put the user terminal on line with the database. It is not uncommon for a person using the terminal and the database to be unfamiliar with performing dialing operations.

In order for a user to access a database, the user must purchase or lease a terminal, and if a print-out is desired, a printer. The relatively high cost of acquiring a terminal has discouraged many potential users from using computer database services. However, a large number of terminals for automatic teletypewriter switching services, such as, for example, Western Union TELEX service, or RCA GLOBECOM International Record Carrier Service, are presently in existance. These terminals are usually dedicated to a single use, the transmission and receipt of messages over the service, and further, these dedicated terminals operate at relatively low baud rates, that is baud rates typically below 150 baud, and for TELEX terminals, baud rates of 50 and 110. Communications costs, that is, carrier time charges, and computer time charges would be excessive if dedicated terminals with low operational baud rates were used as remote terminals for communication with a database. Moreover, dedicated teletypewriter terminals, such as a TELEX terminal, having a fewer number of keys, are incapable of communicating with a database in the same manner as a standard CRT terminal.

It would be desirable to provide an interface for a terminal of an automatic switching service that enables a relatively unskilled person to actuate a switch or terminal keys, or a small number of switches or terminal keys, to automatically put the terminal on line with the remote database.

When a teletypewriter terminal is used for electronic mail, that is, sending and receiving of messages, it is desirable for the terminal to be able to compose and edit messages when the terminal is off-line with the database, so that the user does not incur charges for telephone, intermediate carrier, and computer time. Also, with regard to electronic mail, it is desirable for the database to be able to communicate with the user terminal, and, more specifically, the database may receive messages from other terminals that are addressed to a particular user terminal. It would be desirable for the database to be able to either communicate the message to the remote user terminal or signal the remote user terminal that a message is available at the database for the user terminal.

It is known to provide an autodialer for a down-line user terminal, and more specifically, it is known to provide an automatic dialer that performs the operations of network activation, log-on sequencing and hand-shaking with the remote database wherein code, baud rate of the terminal and other protocol information is transmitted to the remote database. However, autodialers known to applicant do not transmit messages to the database, nor do they receive messages from the database.

Conventional autodialers are programmed by the user to access various databases. It would be desirable for a database to be able to reprogram the operations that are automatically performed by the autodialer at the user terminal.

SUMMARY OF THE INVENTION

In accordance with one aspect of the present invention, a microprocessor operated telecommunications interface for a low speed terminal of an automatic teletypewriter switching service is provided. The interface is connected to a telecommunications line such as a telephone line to provide for transmission of data between a dedicated terminal and a remote database. The interface is preferably an apparatus that is positioned immediately adjacent the dedicated terminal to enable the user to simultaneously use both the interface and the terminal. The interface includes a microprocessing unit (hereinafter "MPU") for centrally controlling the functioning of the interface. The MPU is operated by a memory, preferably a read-only memory. A random access memory is accessible by the MPU and stores message information, database identification information, user identification information and dialing information. A telecommunications modem for converting digital information as processed by the MPU to information for telecommunications transmission is provided and is connected to the telecommunications line. The interface also includes a mechanism for formatting and controlling serial asynchronous datacommunications information transmitted between the user terminal and the MPU. The mechanism is typically referred to as an asynchronous communications interface adaptor (hereinafter "ACIA").

The interface includes at least two user actuatable mechanisms for selecting functions for the interface. The mechanisms may be switches located on the front panel of the interface, or may be codes entered on the terminal keyboard. In the latter case, when the terminal is turned on, a menu appears on the associated printer inquiring from the user which function he desires. The user then enters the code for the desired function on the keyboard. One function selecting code or user switch accesses the user terminal to the MPU to provide for entry and editing of message information in the random access memory. Thus, while the low speed dedicated terminal is off line from the database, a message may be entered into the memory of the interface and the message can be edited by the user terminal. Once the message is ready to be transmitted to the database, a second function selecting code or user switch actuates the telecommunications modem to dial the database using database dialing information stored in the random access memory. The MPU transmits user identification information stored in the memory to the database, which in turn requests message information stored in the interface memory. The MPU then transmits the message information to the database.

In accordance with one aspect of the invention, the telecommunications modem of the interface is responsive to incoming telecommunications traffic originated by the database. After connection is made between the interface and the database, the MPU transmits user identification information stored in the random access memory to the database, and the MPU accesses the database to the random access memory to enable the database to reprogram at least a portion of the random access memory. Because the interface is remotely reprogrammable, the database can alter the dialing information, the database identification information, the user identification information and other information stored in the random access memory without the knowledge of the user. The database can also reprogram the interface so that further use of the interface for connection with the database is not possible, and so that the interface informs the user by a prompt that it is out of service, for whatever reason, including non-payment by the user of database service charges.

By using an interface in accordance with the present invention, the interface receives and sends characters to and from the teletypewriter terminal at the low speed it has been designed for in the special BAUDOT code set as required. When the interface is in the edit mode, or on-line to the database, characters received from the teletypewriter terminal are first converted to the equivalent ASCII code before being stored in the random access memory or transmitted to the database. Similarly, ASCII characters having been received from the database or read from the random access memory are first converted to equivalent BAUDOT codes before being output to the teletypewriter terminal.

When connected on-line with the database, codes are received and transmitted by the interface at the higher speeds required by the database and public data networks carriers using smaller amounts of carrier time and computer time than the original TELEX service, thereby reducing communications and computer costs.

The interface must not obstruct incoming traffic for the teletypewriter terminal or other terminal having a dedicated telecommunications line. In accordance with one aspect of the invention, the interface includes means for interrupting operation of the interface for incoming terminal traffic. When the interface is in an edit mode or on-line with the database, the MPU opens a normally closed relay to disconnect the teletypewriter terminal from the TELEX service dedicated line and connects the teletypewriter to the interface. The MPU periodically senses the TELEX line for incoming traffic. Upon sensing incoming traffic, if the terminal is in use by the interface, a message is typed on the terminal signaling to the user incoming traffic. The relay is released to reconnect the terminal to the dedicated line. Interface functions which do not use the terminal proceed as usual. If the terminal is on-line with the database which is expecting communication from the keyboard, the database may disconnect the interface after a predetermined period of time. Once the traffic is complete, the interface may be reactivated by the user by pressing the desired function switch or keyboard key, or optionally automatically by the MPU when traffic is no longer sensed on the TELEX service dedicated line.

Additional advantages of an interface in accordance with the present invention will be apparent from the following detailed description of the invention.

BRIEF DESCRIPTION OF THE DRAWINGS

FIG. 11 is a logic block diagram for the telex traffic interrupt mode for the interface.

DETAILED DESCRIPTION OF THE INVENTION

Figure 1:
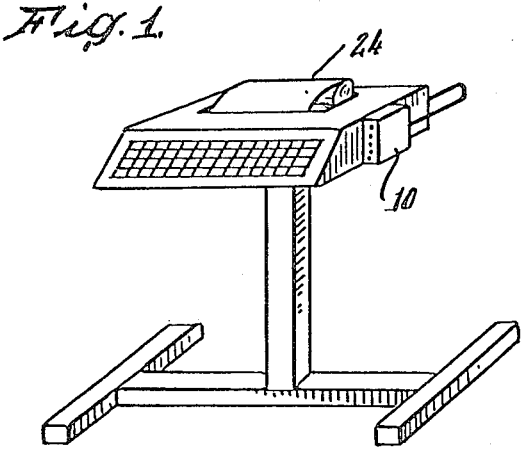
FIG. 1 is a perspective view of the interface secured adjacent to a terminal of an automatic teletypewriter switching service, such as a TELEX service.
Figure 2:
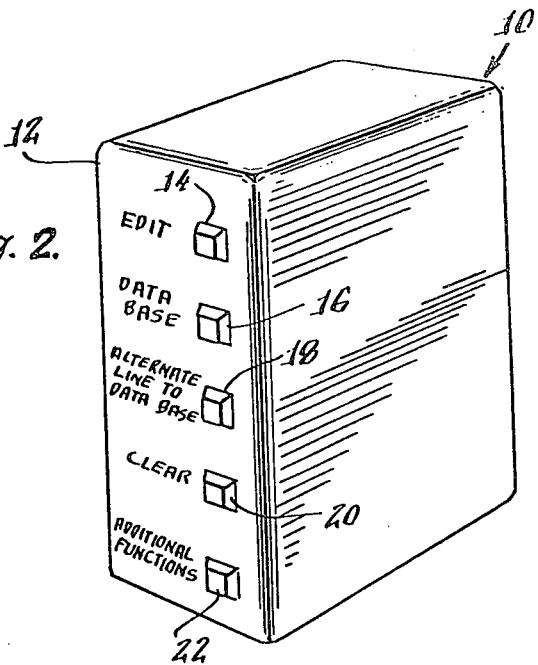
FIG. 2 is a perspective view of an interface in accordance with the present invention.
Figure 3:
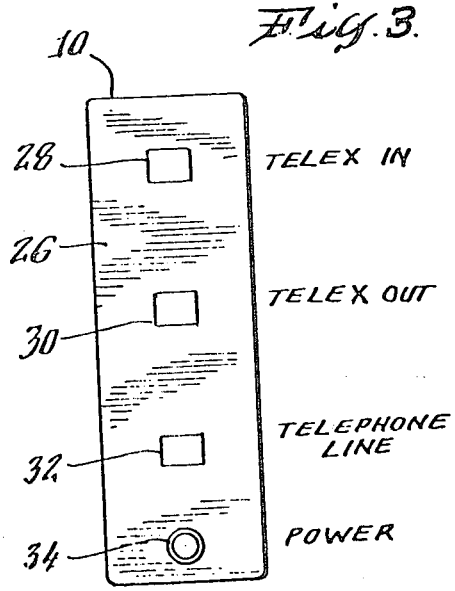
FIG. 3 is a rear plan view of the interface shown in FIGS. 1 and 2.

Referring to FIG. 2, an enlarged perspective view of the interface apparatus is shown. Interface 10 includes a front control panel 12 having a plurality of function switches 14, 16, 18, 20 and 22 that are user-actuatable switches for selecting the desired mode for the interface. It should be understood that the interface control functions represented by the control switches may also be actuated from the terminal keyboard using specially assigned keystrokes, invoking the inclusion of the user switches 14, 16, 18, 20 and 22, an option which is included in these embodiments for example purposes. In accordance with the embodiment of the invention shown in FIGS. 1 and 4, the interface 10 is suitable for use with a terminal of an automatic teletypewriter switching service such as TELEX. The teletypewriter terminal 24 is shown in FIG. 1 with the interface 10 mounted on one side thereof. It should be understood that the interface 10 should be mounted in close proximity to the terminal 24, but not necessarily attached thereto. As shown in FIG. 3, the interface which is associated with a telex terminal 24 includes a rear panel 26 having various connectors including connector 28 for input of the dedicated line, connector 30 for output of the dedicated line, connector 32 for connection to the telephone line or other telecommunications line, and power input 34. It should be understood that a telex terminal is shown by way of example only, and that other types of terminals for automatic teletypewriter switching services may be used with the interface 10.

Figure 4:
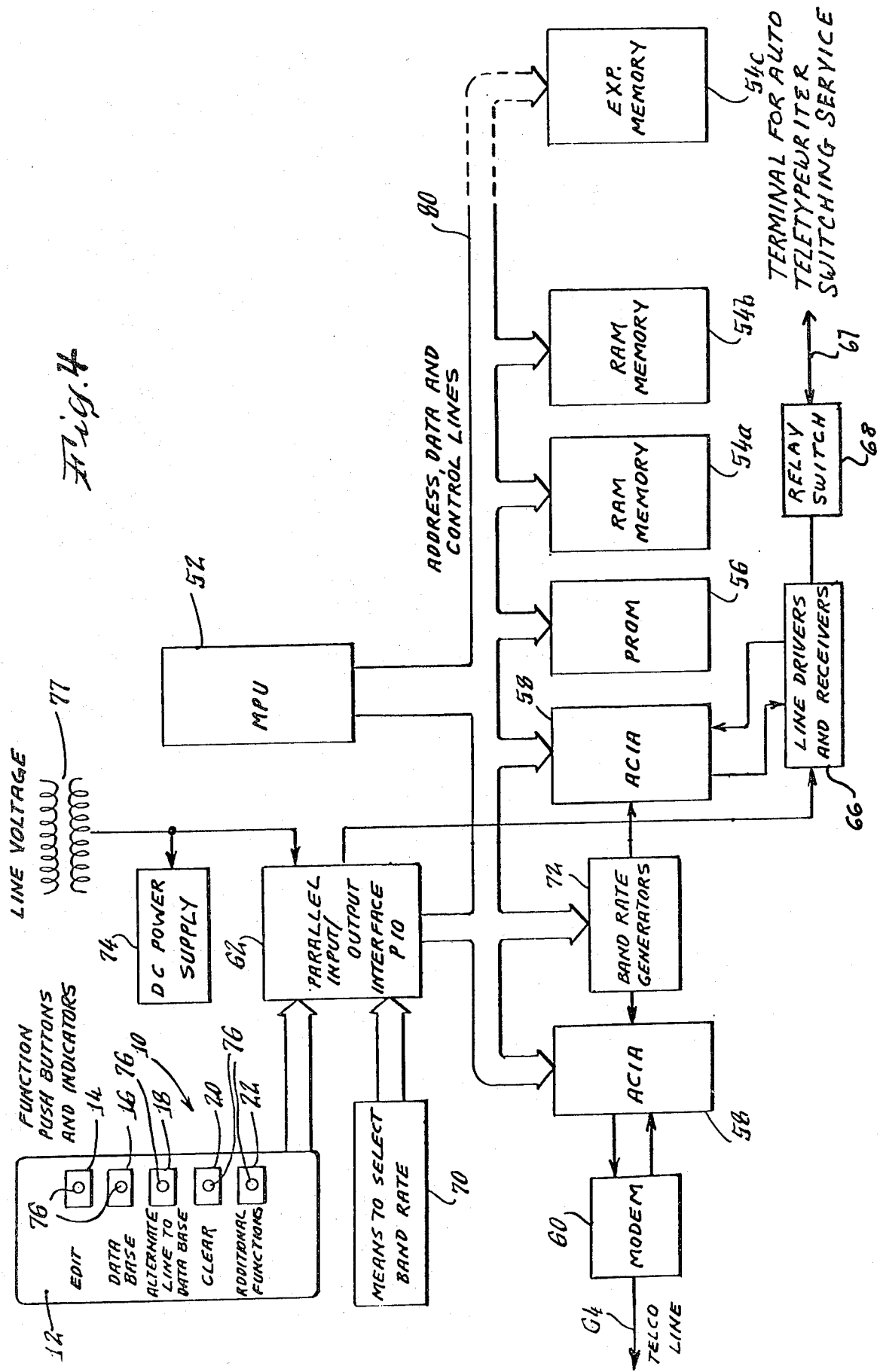
FIG. 4 is a schematic block diagram of the internal components of the interface shown in FIG. 3.
Figure 5:
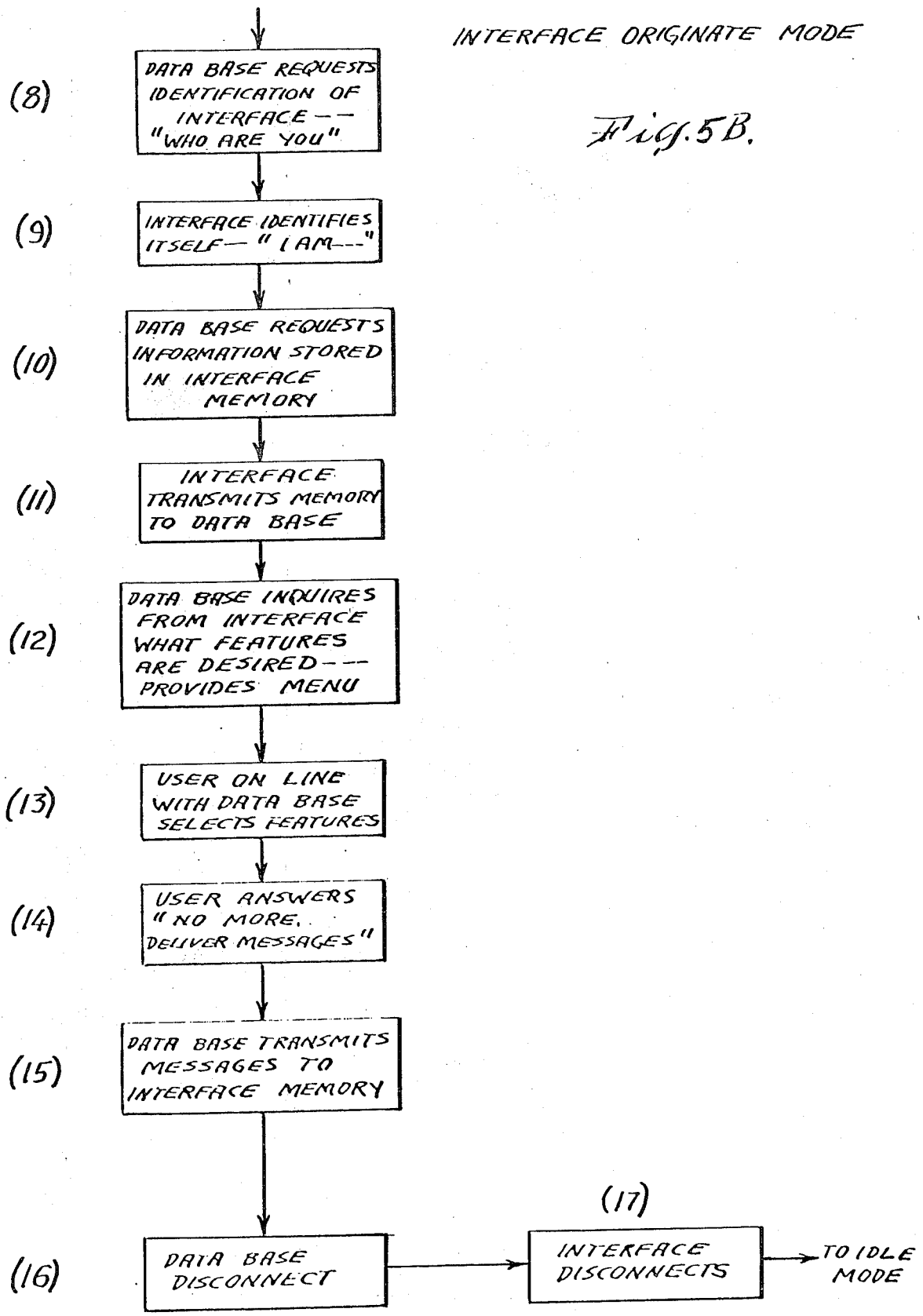
FIGS. 5a and 5b are a logic block diagram of the mode of the interface wherein the interface originates a message.
Figure 6:
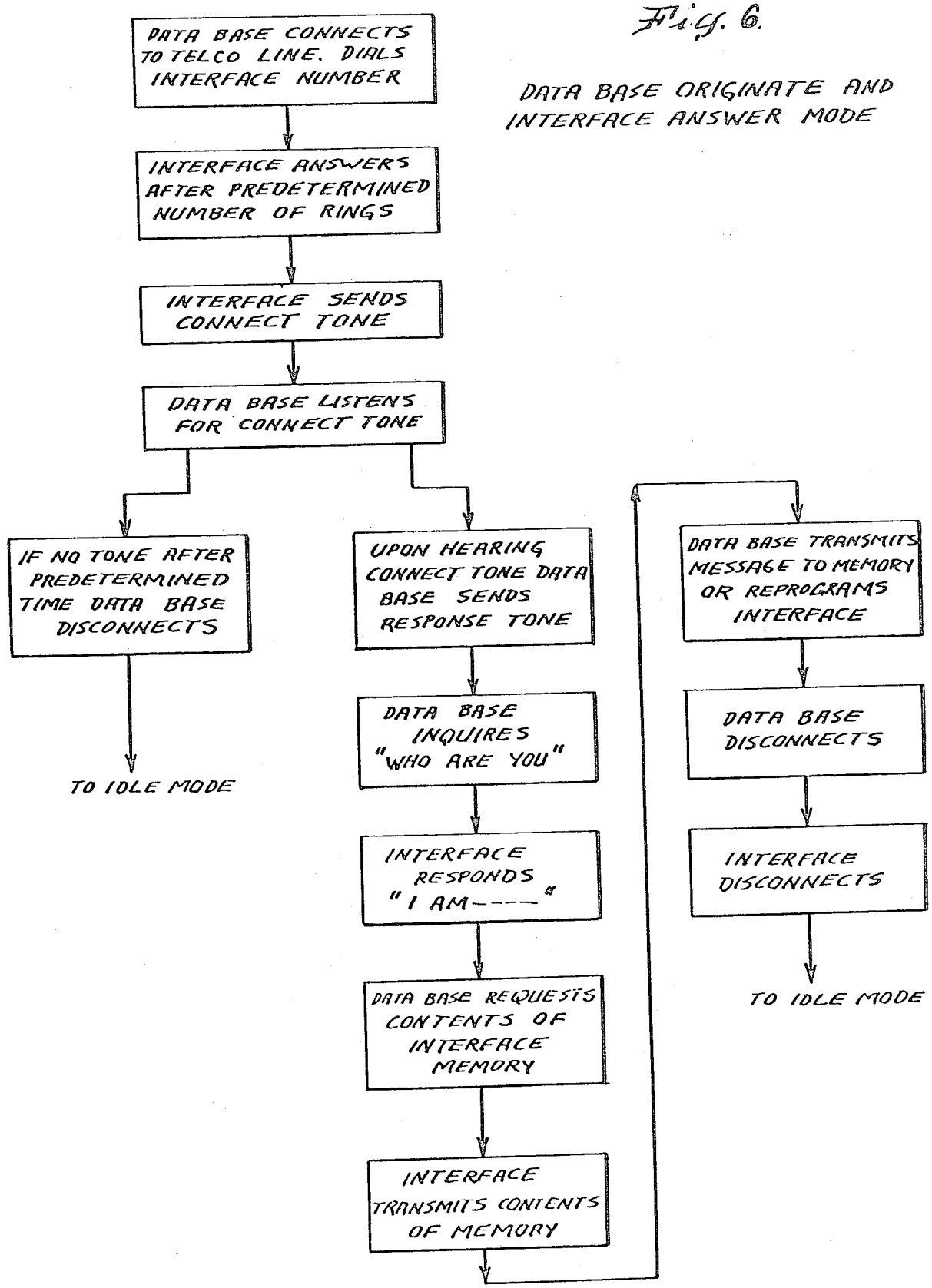
FIG. 6 is a logic block diagram of the mode of the interface wherein the database originates a message and the interface answers.

Referring to FIG. 4, a schematic diagram of the internal components of the interface is shown. The interface includes a microprocessing unit (hereinafter "MPU") for centrally controlling the functioning of the interface. The MPU includes the control logic, the instruction decoding and the arithmetic-processing circuitry for the interface. The MPU may, but does not necessarily, include memory capacity. The preferred MPU used in the interface of the present invention is a MOTOROLA MC68701 unit which is an eight-bit microcomputer unit. It should be understood that in most instances, for the interface of the present invention, only one MPU is necessary. However, it should be understood that the microprocessing unit of the present invention may include two or more chips. The information specifications for the MOTOROLA MC68701 microcomputer unit are published in informational literature titled MOTOROLA SEMICONDUCTORS, MC68701 and MC68701-1, 1980. The MOTOROLA MC68701 chip is shown by way of example and other processor chips may be used such as, for example, the ZILOG Z80 family of chips.

The interface includes random access memory 54 for storing dial-up information, user identification information, database identification information, message information and any other types of information for storage. Although two ram chips, 54a and 54b, each having approximately 2 K bytes of memory are shown, it should be understood that the memory capability of the interface can be expanded by adding expansion memory 54c. Additional memory may be particularly useful when the interface is used with a data library containing either bibliographic type records or user accessible software for special functions. It should be understood that in most instances when a terminal is put on-line with a database library and the terminal has access to substantially the entire library, the costs of using on-line time are relatively high. In an interface with expansive memory, a section of the database library memory could be temporarily stored in random access memory and manipulated off-line by the user terminal rather than on-line as is the usual case. Once the library data stored in the interface memory has been accessed by the user terminal, and the user terminal is disconnected, the software which operates the MPU can erase the library data stored in the random access memory thereby preventing unauthorized further use of the library data. By use of an interface having a relatively large memory, a library database can increase the number of customers using its services without substantially expanding its equipment and telephone service because each user consumes a reduced amount of on-line computer time.

The interface includes a read-only memory 56 for storing the operational software for the MPU. The read-only memory can be of various conventional types and can be a programmable read-only memory, a magnetically erasable programmable read-only memory, or an electrically erasable programmable read-only memory, or read-only memories of the type to be hereinafter developed.

The interface includes an asynchronous communications interface adaptor (hereinafter "ACIA"). An ACIA provides the data formatting and control to interface serial asynchronous datacommunications information to bus organize systems. The bus interface includes select, enable, read/write, interrupt, and bus interface logic to allow the transfer over various bidirectional data buses. Data transmission is accomplished in a serial mode whereas the MPU has a bus system that operates in a parallel mode. By performing parallel-to-serial and serial-to-parallel conversion, the ACIA provides means for communication between the MPU and peripheral equipment such as the user terminal, the telecommunications modem 60, printers and other equipment requiring asynchronous data format.

The interface also includes a parallel input-output interface (hereinafter "PIO") which allows the MPU to input and output parallel data to and from external devices. The PIO 62 is connected to panel 10 for pushbuttons 14, 16, 18, 20 and 22. It is also connected to means to select baud rates for port 66. Other outputs of PIO 62 are used to select port 66 for input or output to or from the interface.

The interface includes a telecommunications modem, which is a device which converts data from a form compatible with the MPU to a form that is compatible with telecommunications transmission facilities. A conventional modem is divided into two logical segments, the modulator and the demodulator. The modulator accepts digital input from the MPU and converts the squared D.C. pulse voltages to analog audio signals which are sent over the telecommunications line 64. At the other end of the telecommunications line 64, a demodulator of a second modem reconverts the analog signals to digital outputs. It should be understood that the telecommunications line is initially a standard telephone line. The standard telephone line may connect with an intermediate carrier. The interface includes line drivers and receivers 66 for power application of output signals from the MPU to allow the drivers to function on a heavy circuit load. The line drivers and receivers 66 may be connected to terminal 36 as shown in FIG. 1.

The interface also includes a mechanism 70 for adjusting the interface to accomodate terminals having various baud rates. The baud rate for the port for the terminal may be selected from among standard rates between 50 baud and 9600 baud by adjusting the mechanism 70 for selecting the baud rate. Once the mechanism 70 is set for a particular baud rate, upon application of power, the MPU sets the baud rate selected for the particular port being used. Since the baud rate is actually MPU controlled, the port baud rate can be changed at will by the MPU and can be changed or adjusted by codes received from the database.

The interface includes a D.C. power supply 74 which is preferably powered by a conventional electric outlet such as 110 volt alternating current outlet. The D.C. power maintains a line voltage 76 for the interface. In addition to the D.C. power supply through power supply 74, one or more of the memories, particularly random access memories 54a, b and c may have backup batteries for maintaining the memory in the case of a power failure.

Referring to FIGS. 5 through 11, the various operational modes of the interface will now be described. The mode in which the interface originates a message to the database will be described with respect to FIGS. 5A and 5B. In order for the user to transmit a message to the database, or to go on-line with the database, the user simply pushes button 16 for the database or actuates the correspondingly assigned key from the keyboard. The MPU closes a relay in the telecommunications modem 60 and thereafter waits a predetermined amount of time for the dial tone to be obtained. The modem controlled by the MPU dials the database using a number that it obtains from the random access memory 56. It should be understood that the dialing information may include not only a telephone number, but also may include the number of an intermediate carrier. The MPU thereafter delays operation to obtain a ring. The modem listens for a connect tone. It no connect tone is obtained within a predetermined time, the MPU opens a modem relay and gives a prompt to the user to press switch 18 or the corresponding key on the keyboard which causes dialing via alternative dial steps 1(b), 2, 3, 4, 5, 6 and 7(b), using different dialing information stored in the random access memory. For example, if the intermediate carrier is down for some reason, the database may still be contacted by dialing the database directly over the telephone line without the use of an intermediate carrier. The MPU can be programmed to automatically select the third function in the event of a failure to connect after actuation of the second function switch 18.

Referring to FIG. 5A, step 7, if the connect tone is received, a tone response is made by the interface, and identification information is sent to the database via the intermediate carrier or the telephone line. Thereafter the database requests identification of the interface, by asking the interface using standard identities inquiry signals. The interface identifies itself by transmitting to the database the user identification information stored either in the user terminal or in the random access memory of the interface. The database may then request information stored in the interface memory, such as, for example any message that may be in the random access memory. The interface then transmits the memory to the database, and the database may inquire from the interface what other functions or services are desired by providing a menu of available functions or services.

The user who is on-line with the database, selects any desired functions or services or finally the user informs the database that it requires no more services and instructs it to deliver any messages. The database transmits any messages it may have for the interface to the interface memory. The database disconnects, the interface disconnects, and the interface returns to an idle mode which will be described hereinafter with reference to FIG. 12.

It should be understood that the interface originate mode described in FIGS. 5A and 5B is initiated by the user who simply presses a single switch 16 or assigned keystroke. Thus a user, who may not be familiar with use of a terminal to provide log-on information to the database, can go on-line with the database and transmit a message by simply pressing a button or key. Once on-line with the database, the database provides a menu and leads the user, who may be unsophisticated in computer use, through any desired steps.

Figure 8:
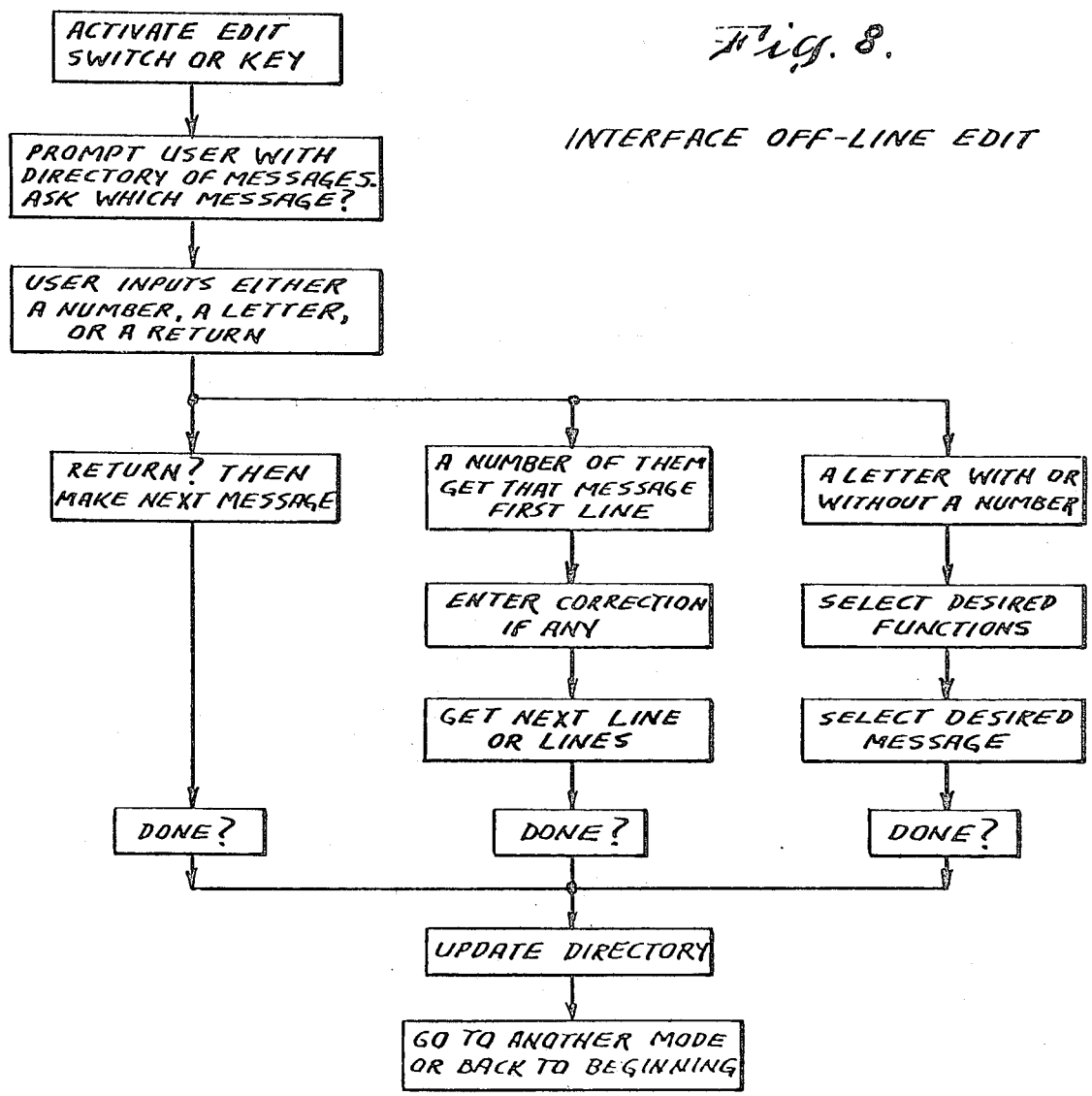
FIG. 8 is a logic block diagram of the mode of the interface wherein off-line editing may be accomplished.

Referring to FIG. 8, the mode wherein the database originates and the interface answers is described. The database connects to the telecommunication line and dials the interface number either directly over a telephone line or via an intermediate carrier. The interface answers after a predetermined number of rings and sends a connect tone. The database listens for a connect tone and if no tone is obtained after a predetermined time, the database disconnects and returns to its idle mode. If the database connects with the interface, it sends a response tone to the interface and inquires for user identification information. Once the interface identifies itself, the database requests the contents of the interface memory which are thereafter transmitted by the interface. The database may then transmit a message to the interface memory or reprogram the interface. More specifically, in the reprogramming operation, the random access memory of the interface may be reprogrammed and the dialing information, the user identification information, the database identification information or any other information stored in the random access memory can be reprogrammed. The database can reprogram the interface without knowledge of the user, and therefore can change the dialing information to use a different carrier, or may change other desired aspects of the memory. After the database has transmitted the message or reprogrammed the interface, the database disconnects, the interface disconnects and the interface returns to its idle mode which will be described hereinafter with respect to FIG. 10.

Figure 7:
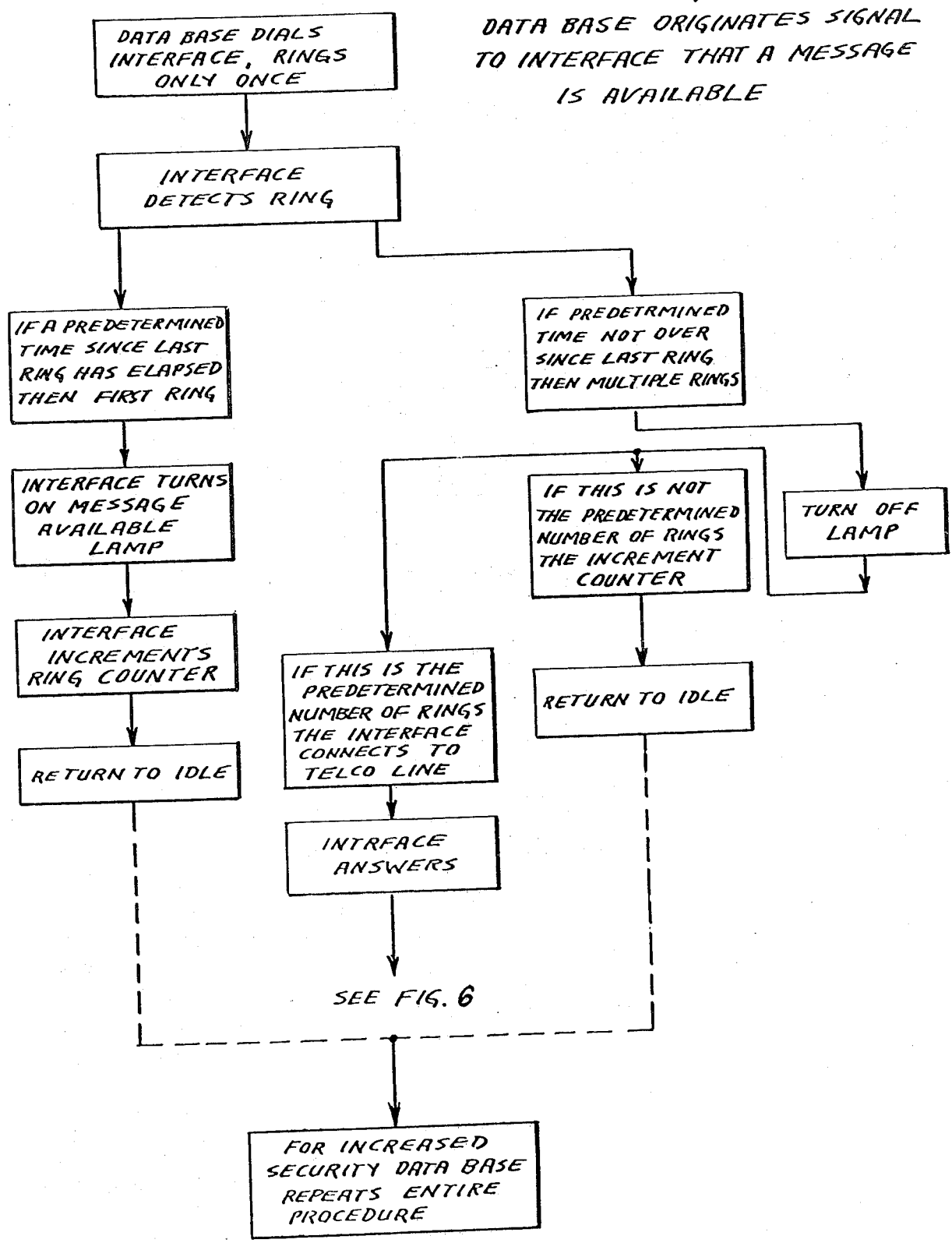
FIG. 7 is a logic block diagram for the mode of the interface wherein the database originates a signal to interface that a message is available at the database.

Referring to FIG. 7, the mode in which the database originates a signal to the interface that a message is available is shown. This mode is particularly useful in that the user is informed that a message is available at the database, yet no carrier charge is incurred by the database. The database dials the interface using a telephone line and rings a predetermined number of times, preferably only once, and thereafter hangs up. It should be understood that the MPU may be programmed to detect any predetermined number of rings, one ring being by way of example. Once the interface detects a ring, the interface turns on a message available lamp 76 on interface indicating that a message is available at the database. In the embodiment wherein the interface is operated from the terminal keyboard, the interface includes a lamp or other indicating means for informing the user that a message is available at the database. The interface increments a ring counter that counts the number of rings and returns to idle. After a predetermined time has elapsed, the ring counter is reset so that any subsequent rings are considered first rings. For increased security, the database repeats the entire procedure shown in FIG. 7 so that the lamp lights whether one or both dial-ups succeed. If the predetermined time is not over since the last ring, then the MPU, sensing multiple rings, turns off the lamp. If the line rings the predetermined number of times sufficient to connect to the telephone line, the interface answers and follows the procedure shown in FIG. 6. If the database does not ring a sufficient number of times to cause the interface to answer, the interface simply returns to idle.

Referring to FIG. 8, the interface off-line edit mode is shown. The user actuates the edit switch 14 shown in FIG. 4, or the corresponding assigned key on the keyboard to initiate the edit mode. A prompt is typed on the user's terminal showing a directory of messages currently in the random access memory assigned to the edit function, asking which message the user wishes to edit. The user may enter either a message number to select one of the existing messages, or a return key to indicate that he wishes to make a new message. The user may also enter keystrokes which represent certain other desired operations including, but not limited to, delete a message, print a message on the accessory printer if used, protect a message from being inadvertently transmitted, and the like. If an existing message is to be edited, the first line of the selected message is output to the terminal with the carriage or cursor stopping at the end of that line. If no corrections or additions are to be made to that line, the return key causes the next line to be output and so on. The user may also enter a number and return key to cause that number of lines to be output. Depressing the edit switch 10 in FIG. 4, or the corresponding assigned key from the keyboard while the edit mode is active, will disable the edit mode.

After one or more messages have been entered into the random access memory assigned to the edit mode, switches 16 or 18 of FIG. 2, or the corresponding assigned keys from the keyboard, may be activated to access the database for delivery of the messages. Upon request fo the database, those messages which are not protected, and are completed will be transmitted to the database. Upon completion of the transmission, the remaining protected or imcomplete messages are moved to the beginning of the random access memory assigned to the edit mode and the message directory is updated.

Figure 9:
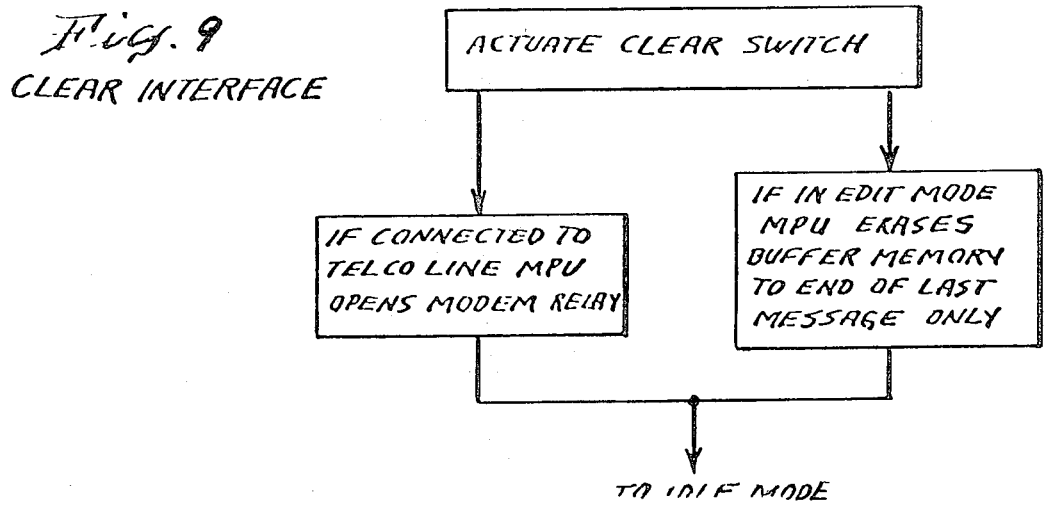
FIG. 9 is a logic block diagram for the mode for clearing the interface.

FIG. 9 shows the mode wherein a portion of the interface buffer memory is cleared. The user actuates the clear switch 20 or a corresponding assigned key from the keyboard and if the interface is connected to a telecommunications line, the MPU opens the modem relay and the interface returns to an idle mode. If the interface is in an edit mode, the MPU deletes from the buffer memory the current message being edited only. It should be understood that each message in the buffer memory has a beginning of message indication and an end of message indication. By pressing the clear switch, only the currently edited message is deleted. Additional messages can be deleted through manipulation of the terminal.

Figure 10:
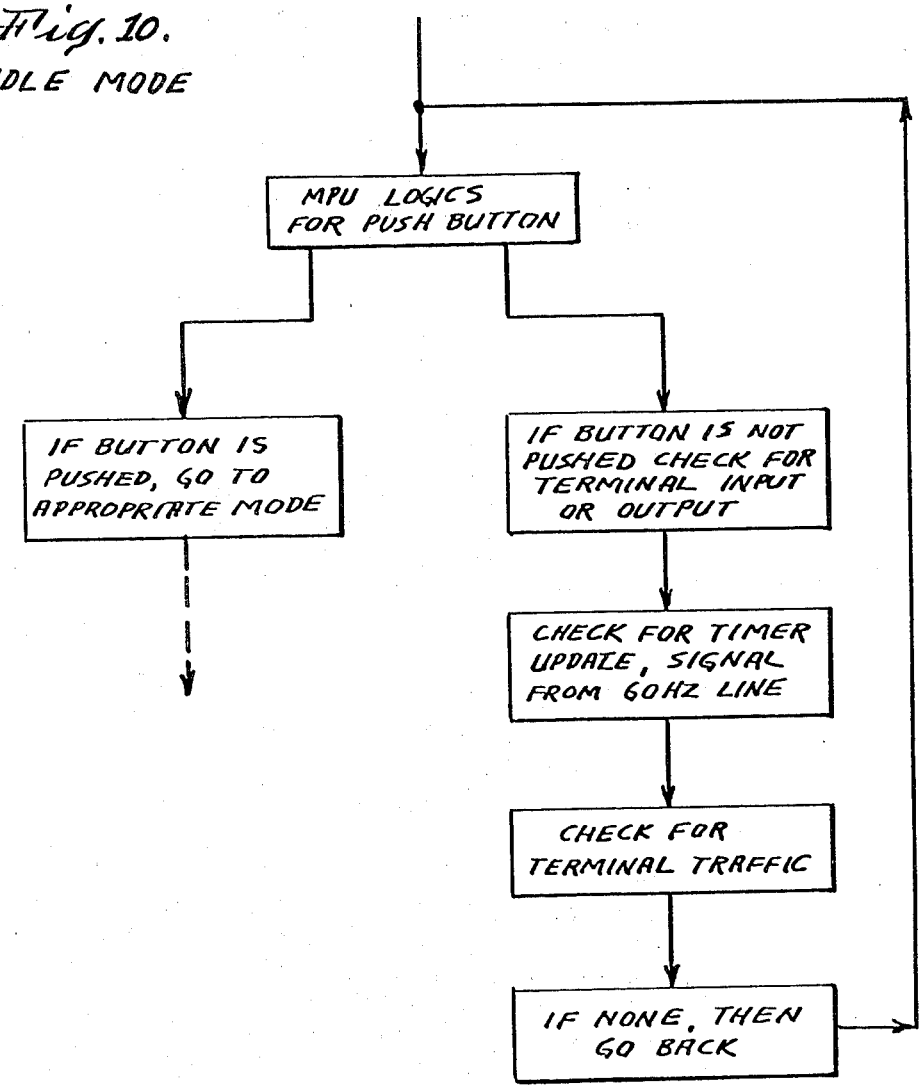
FIG. 10 is a logic block diagram for the idle mode of the interface.

Referring to FIG. 10, the idle mode of the interface is shown. The MPU periodically looks for one of the switches 14, 16, 18, 20, or 22 to be actuated. When a switch is pushed, the interface initiates the appropriate mode. The interface also periodically checks for a terminal input and checks for a timer update signal from a 60 Hertz line. In the case where the interface is connected to a terminal similar to a telex terminal, the MPU checks for traffic and, if traffic is present, goes to the mode shown in FIG. 11. The interface then repeats the periodic checking for changes in state.

Referring to FIG. 11, the interface interrupts certain functions to enable incoming traffic to be received by the terminal. As shown in FIG. 11, if the edit or an online mode is active, the MPU opens a normally closed relay 68 to disconnect the teletypewriter terminal from the TELEX line 67 and connect the terminal to the interface. The MPU periodically senses for incoming TELEX traffic. Upon incoming TELEX traffic, if the terminal is in use by the interface, a message is typed on the teletypewriter terminal signalling incoming TELEX traffic, then the relay 68 is released to reconnect the terminal to its TELEX line. Interface functions which do not use the terminal proceed as usual. If the terminal is on-line with the database, the database disconnects after a predetermined period. Thus, the terminal may be operated via its dedicated line while the interface is sending or receiving a message over a telephone line. Once the TELEX traffic is complete, the interface must be reactivated to the desired mode.

Referring once again to FIG. 4, the function pushbuttons 14, 16, 18, 20 and 22 may each include a respective light emitting diode 76 that is lighted when its respective mode is on, or in the case where a message is available at the database, the light for switch 16 may be on. The various components of the interface including the MPU 52, the read-only memory 56, the ram memory 54a, b, and c, the ACIA 58 and the PIO 62 are connected to one another by address, data and control lines which are indicated schematically at reference character 80.

It should be understood that an interface in accordance with the present invention is particularly useful for persons not sophisticated in the use of computers because the interface may be operated by simply pushing one of the function buttons 14, 16, 18, 20 and 22 or similarly assigned keys on the keyboard. Function button 22 exemplifies that the interface may have additional functions added if desired. The user may send a message and connect directly to a database simply by pushing the database button 16 or the assigned key from the keyboard, or if that (line access) fails to connect, the alternative access to the database shown at reference character 18. Moreover, the database may either inform a user that a message is available at the database without incurring carrier charges or the database can transmit the message to the user and reprogram the random access memory of the interface.

The interface provides for interruption of terminal and interface interaction to allow the terminal to receive incoming messages and the required baud rate and code conversion necessary to permit the teletypewriter to be used, through the interface, with intermediate carriers and databases.

It should be understood that although specific embodiments of the invention have been described herein in detail, such description is for purposes of illustration only and modifications may be made thereto by those skilled in the art within the scope of the invention.

I claim:

1. A microprocessor operated telecommunications interface for connection to a telecommunications line to provide transmission of data between a terminal of an automatic teletypewriter switching service of the type operating in one code and a database of the type operating in another code, the interface comprising:
   a microprocessing unit (MPU) for centrally controlling the functioning of the interface;
   memory for operating said MPU;
   a random access memory accessible by said MPU for storing message information, dialing information and user identification information;
   a telecommunications modem for converting digital information to information for telecommunications transmission, said telecommunications modem being connected to said telecommunications line;
   means for formating and controlling serial asynchronous data communication information transmitted between said user terminal and said MPU;
   at least two user-actuatable means for selecting a function of said interface, one said function selecting means accessing said MPU to said user terminal to provide for entry and editing of message information in said random access memory by said user terminal;
   a second said function selecting means actuating said telecommunications modem to dial said database using said dialing information stored in said random access memory, said MPU transmitting user identification stored in said random access memory to said database, said MPU upon request by said database transmitting message information to said database; and said telecommunications modem being responsive to incoming telecommunications originated by said database, said MPU transmitting user identification information stored in said random access memory to said database, said MPU accessing said database to said random access memory to enable said database to reprogram at least a portion of said random access memory.

2. An interface according to claim 1 and further including means for converting said database code into said terminal code and vice versa.

3. An interface according to claim 1 and further including:
means for periodically sensing for incoming terminal traffic; and
means controlled by said MPU for disconnecting said terminal from interface when incoming traffic is sensed.

4. An interface according to claim 3 and further including:
means for sending a prompt to the terminal informing the user of said disconnect for incoming terminal traffic.

5. An interface according to claim 3 wherein said means for disconnecting comprises an MPU operated relay switch.

6. An interface according to claim 1 wherein said user terminal operates at a predetermined baud rate, said interface further including means for selecting the baud rate of said interface.

7. An interface according to claim 1 and further including means for signaling that a message is available at said database, said MPU detecting a telephone ring at said telecommunications modem, said MPU sensing the amount of time elapsed since a previous ring, said MPU after a predetermined amount of time, actuating said signal means to thereby signal the user that a message is available at said database.

8. An interface according to claim 7 wherein said signalling means comprises an electrically powered light.

9. An interface according to claim 1 and further including at least a third function selecting means, said MPU upon failure to connect said interface with said database upon actuation of said second function selecting means transmitting a prompt to said user terminal indicating a failure to connect, said third function selecting means actuating said telecommunications modem to dial said database using alternate database dialing information stored in said random access memory, said MPU transmitting user identification stored in said random access memory to said database, said MPU upon command from said database transmitting message information to said database.

10. An interface according to claim 9 wherein said interface includes an automatic means to select said third function in the event of a failure to connect said interface with said database upon actuation of said second function.

11. An interface according to claim 1 wherein said interface includes at least an additional function selecting means, said function selecting means causing said MPU to clear at least a portion of said random access memory.

12. An interface according to claim 1 wherein said database code comprises ASCII code and said terminal code comprises BAUDOT code.

13. A microprocessor operated telecommunications interface for connection to a telecommunications line to provide transmission of data between a terminal of an automatic teletypewriter switching service and a database, the interface comprising:
a microprocessing unit (MPU) for centrally controlling the functioning of the interface;
memory for operating said MPU;
a random access memory accessible by said MPU for storing message information, dialing information, and user identification information;
a telecommunications modem for converting digital information to information for telecommunications transmission, said telecommunications modem being connected to said telecommunications line;
means for formating and controlling serial asynchronous data communications information transmitted between said user terminal and said MPU;
at least two user-actuatable means for selecting a function of said interface, one said function selecting means accessing said MPU to said user terminal to provide for entry and editing of message information in said random access memory by said user terminal;
a second said function selecting means actuating said telecommunications modem to dial said database using said dialing information stored in said random access memory, said MPU transmitting user identification stored in said random access memory to said database, said MPU upon request by said database transmitting message information to said database; and
means for signaling that a message is available at said database, said MPU detecting a telephone ring at said telecommunications modem, said MPU sensing the amount of time elapsed since a last ring, said MPU after a predetermined amount of time, actuating said signal means to thereby signal the user that a message is available at said database.

14. An interface according to claim 13 and further including means for converting said database code into said terminal code and vice versa.

15. An interface according to claim 13 and further including:
means for periodically sensing for incoming terminal traffic; and
means controlled by said MPU for disconnecting said terminal from interface when incoming traffic is sensed.

16. An interface according to claim 15 and further including:
means for sending a prompt to the terminal informing the user of said disconnect for incoming terminal traffic.

17. An interface according to claim 15 wherein said means for disconnecting comprises an MPU operated relay switch.

18. An interface according to claim 13 wherein said telecommunications modem being responsive to incoming telecommunications originated by said database, said MPU transmitting user identification information stored in said random access memory to said database, said MPU accessing said database to said random access memory to enable said database to reprogram at least a portion of said random access memory.

19. An interface according to claim 13 and further including at least a third function selecting means, said MPU upon failure to connect said interface with said database upon actuation of said second function selecting means transmitting a prompt to said user terminal indicating a failure to connect, said third function selecting means actuating said telecommunications modem to dial said database using alternate database dialing information stored in said random access memory, said MPU transmitting user identification stored in said random access memory to said database, said MPU upon command from said database transmitting message information to said database.

20. A method for interfacing a terminal of an automatic teletypewriter switching service with a database by a microprocessor operated telecommunications interface having a microprocessor, a random access memory and a telecommunications modem, said method comprising;
A. originating a message from said user terminal to said database by the following steps:
   actuating a user-actuatable means for originating transmission of said message from the user terminal to the database;
   dialing said database by said modem controlled by said microprocessing unit that obtains database dialing information from said random access memory;
   listening for a connect tone by said telecommunications modem;
   subsequent to connect, sending user identification information stored in said random access memory to said database;
   requesting by said database of said message stored in said random access memory;
   transmitting by said interface of said message to said database;
   accessing said user terminal to said database;
   disconnecting said user terminal from said database;
B. originating a message from said database to microprocessor interface by the following steps:
   dialing of said interface by said database;
   answering said database by said interface after a predetermined number of rings;
   listening for a connect tone by said telecommunications modem;
   subsequent to connect, sending user identification information stored in said random access memory to said database;
   requesting by said database of said message stored in said random access memory;
   transmitting by said interface of said message to said database;
   accessing said interface to said database and reprogramming said random access memory;
   disconnecting said database from said interface; and
C. interrupting said terminal for incoming terminal traffic comprising the steps of:
   periodically sensing for incoming terminal traffic; and
   disconnecting said terminal when incoming traffic is sensed.

21. A method according to claim 20C and further including sending a prompt to the terminal informing the user of incoming traffic.

22. A method according to claim 20 and further including:
D. Originating a signal from the database to the interface that a message is available at the interface by the following steps:
   dialing the interface by the database, and ringing the interface a predetermined one or more times;
   detecting by the interface of said predetermined number of rings;
   sensing by the interface for a predetermined length of time since the last ring of the predetermined number of rings;
   turning on a means for indicating a message is available, if the predetermined amount of time has elapsed without another ring.

23. A method according to claim 20 wherein said method further comprises editing a message by the following steps:
   actuating a user-actuatable means for editing a message;
   accessing the user terminal to the random access of the interface;
   entering and editing of a message in the random access memory; and
   actuating user-actuatable means for originating transmission of said message from the user terminal to the database.

24. A method for interfacing a terminal of an automatic teletypewriter switching service with a database by a microprocessor operated telecommunications interface having a microprocessor, a random access memory and a telecommunications moden, said method comprising;
A. originating a message from said user terminal to said database by the following steps:
   actuating a user-actuatable means for originating transmission of said message from the user terminal to the database;
   dialing said database by said modem controlled by said microprocessing unit that obtains database dialing information from said random access memory;
   listening for a connect tone by said telecommunications modem;
   subsequent to connect, sending user identification information stored in said random access memory to said database;
   requesting by said database of said message stored in said random access memory;
   transmitting by said interface of said message to said database;
   accessing said user terminal to said database;
   disconnecting said user terminal from said database;
B. Originating signal from the database to the interface that a message is available at the interface by the following steps:
   dialing the interface by the database, and ringing the interface a predetermined one or more times;
   detecting by the interface of said predetermined number of rings;
   sensing by the interface for a predetermined length of time since the last ring of the predetermined number of rings;
   turning on a means for indicating a message is available, if the predetermined amount of time has elapsed without another ring; and
C. Interrupting said terminal for incoming terminal traffic comprising the steps of:
   periodically sensing for incoming terminal traffic; and
   disconnecting said terminal when incoming traffic is sensed.

* * * * *